United States Patent [19]

Willenz et al.

[11] Patent Number: 5,590,310
[45] Date of Patent: Dec. 31, 1996

[54] METHOD AND STRUCTURE FOR DATA INTEGRITY IN A MULTIPLE LEVEL CACHE SYSTEM

[75] Inventors: Avigdor Willenz, Saratoga; Yiftach Tzori, Sunnyvale, both of Calif.

[73] Assignee: Integrated Device Technology, Inc., Santa Clara, Calif.

[21] Appl. No.: 426,440

[22] Filed: Apr. 21, 1995

Related U.S. Application Data

[63] Continuation of Ser. No. 4,332, Jan. 14, 1993, abandoned.
[51] Int. Cl.[6] ........................................... G06F 12/00
[52] U.S. Cl. ........................ 395/473; 395/445; 395/466
[58] Field of Search .................... 395/403, 468, 395/473, 444, 445, 250, 466

[56] References Cited

U.S. PATENT DOCUMENTS

| | | | |
|---|---|---|---|
| 5,222,224 | 6/1993 | Flynn et al. | 395/425 |
| 5,226,146 | 7/1993 | Milia et al. | 395/468 |
| 5,249,282 | 9/1993 | Segers | 395/425 |
| 5,276,849 | 1/1994 | Patel | 395/425 |
| 5,276,851 | 1/1994 | Thacker et al. | 395/425 |
| 5,307,477 | 4/1994 | Taylor et al. | 395/425 |
| 5,313,605 | 5/1994 | Huck et al. | 395/425 |
| 5,319,766 | 6/1994 | Thaller et al. | 395/425 |
| 5,327,570 | 7/1994 | Foster et al. | 395/482 |
| 5,418,928 | 5/1995 | Yarkoni et al. | 395/403 |

*Primary Examiner*—Rebecca L. Rudolph
*Attorney, Agent, or Firm*—Skjerven, Morrill, MacPherson, Franklin & Friel

[57] ABSTRACT

A structure and a method provide data integrity for a multiprocessor system having a cache memory and a snoop tag cache. In one embodiment, the snoop tag cache copies the tags of a primary cache. Whenever a write operation occurs, the snoop tag cache is accessed to determine if the accessed tag matches a predetermined portion of the address of the memory location on which the write operation is performed. If so, a signal is sent to the CPU associated with the primary cache so that the corresponding entries in the primary cache and the snoop tag cache can be invalidated.

6 Claims, 5 Drawing Sheets

METHOD AND STRUCTURE FOR DATA INTEGRITY IN A MULTIPLE LEVEL CACHE SYSTEM

This application is a division of application Ser. No. 08/004,332, filed Jan. 14, 1993 now abandoned.

BACKGROUND OF THE INVENTION

1. Field of the Invention

This invention relates to computer system designs, and in particular relates to the design of multiple level cache systems.

2. Description of the Related Art

A cached memory system improves the performance of a computer system by exploiting locality of reference. A cache memory is typically implemented by more costly components or circuits which are capable of higher performance (i.e. shorter response time) than those implementing the main memory. By storing in the cache memory copies of small groups of data likely to be accessed repeatedly, performance of the computer system can be enhanced. Extended this concept further, performance of a cache system can be enhanced by having multiple levels of cache memory.

Because a cached memory system contains one or more copies of data stored in the main memory, to ensure that the correct data is provided in a subsequent reference (i.e. to ensure "data coherency"), an update to the data at a memory location must be reflected in all copies of the data residing in the cache memory system. One method for providing data coherency is the cache "write-through" policy, which requires that an update to a datum be immediately written out to the main memory and, at the same time, all other copies of the datum residing in the cached system be invalidated or updated. However, in a shared memory multiprocessor system, in which each processor has a private cache memory, a difficulty relating to data coherency arises. In such a system, in order to maintain data consistency, when a datum in the main memory is updated, it is necessary to update or invalidate all copies of the datum in each processor's private cache memory.

Another instance causing a data coherency problem results from a peripheral device moving data into the main memory system through direct memory access (DMA). In this instance, it is necessary to update all levels of the cache memory system.

Because the central processing unit (CPU) of a computer system often operates asynchronously with the memory system, first-in-first-out (FIFO) buffers are often interposed between the CPU and the memory. During a write operation, instead of waiting for completion of a write operation in the main memory, a CPU simply writes the data into a FIFO. At a subsequent time, the memory controller retrieves the datum from the FIFO and completes the write operation ("retires") in the main memory. Under such a scheme, however, a read access to a memory location must ascertain that there is not an incomplete pending write operation to the memory location, so as to prevent stale data from being read into the CPU. This scheme is further complicated in a shared memory multiprocessor system which allows each processor in the multiprocessor system to write into the same memory space.

Summary of the Invention

In accordance with the present invention, a shared memory multiprocessor system provides data integrity between the main memory and each of the primary cache of the processors in the multiprocessor system by associating with each private cache a "snoop tag cache."

Each snoop tag cache contains a copy of each tag in the assoicated processor's primary cache. The snoop tag cache monitors the main memory's write accesses by monitoring the memory address presented on the memory address bus. When the main memory is accessed for a write operation, logic in the snoop tag cache detects if a "cache hit" occurs. If so, a signal is sent to the associated processor, which would invalidate the corresponding entries in the primary and the snoop tag cache.

According to another aspect of the present invention, a read-write buffer comprising first-in-first-out read and write buffers is interposed between the CPU and the main memory to increase performance. The first-in-first-out buffers allows asynchronous operation between the CPU and the main memory system. The first-in-first-out read buffer supports cache block refill operations. Conflict logic is provided in the read-write buffer to detect the condition when a read operation attempts to read a memory location at which a write operation has not been completed.

According to another aspect of the present invention, parity checking and parity generation is provided in the read-write buffer to check parity, when parity is implemented in the main memory system, and to provide required parity bits for data read from main memory, when the main memory system does not implement parity.

In a shared memory multiprocessor system, by signalling the CPU when a write operation can potentially renders invalid the data in each processor's primary cache, the present invention achieves data integrity in the cache using only simple address comparison circuits by allowing the CPU to invalidate the relevant entries in the primary cache and the snoop tag cache. In addition, data integrity and compatibility are further enhanced by parity checking and parity generation.

Further, by providing a read-write buffer structure, the present invention also provides for asynchronous operation between the main memory system and the CPU. Consequently, the main memory can be implemented without the use of expensive components which operate at the rate of the CPU's clock.

The present invention is better understood upon consideration of the detailed description below and the accompanying drawings.

DETAILED DESCRIPTION OF THE PREFERRED EMBODIMENTS

Figure 1:
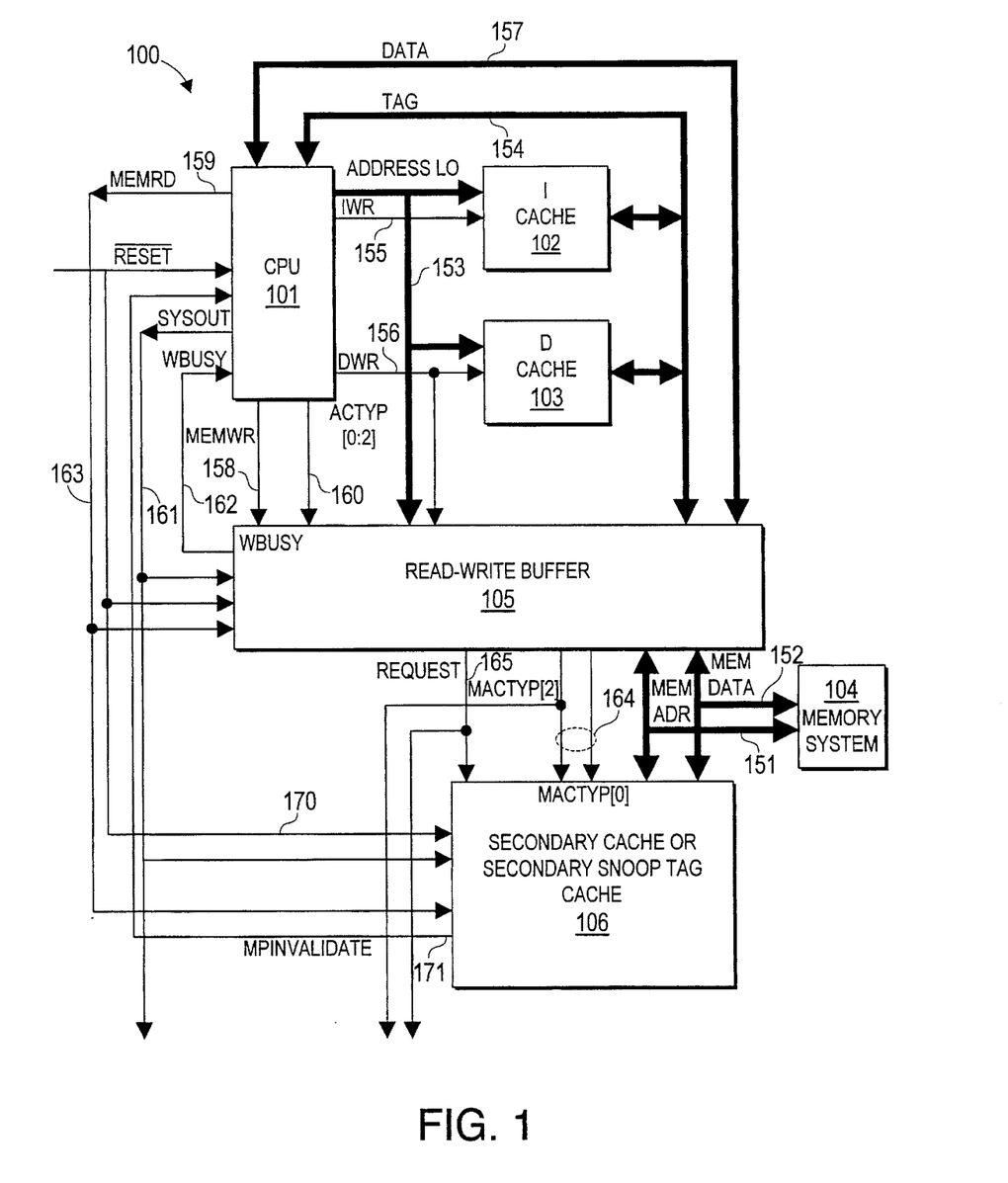
FIG. 1 shows an embodiment of the present invention in which a computer system 100 comprises a CPU 101, instruction and data cache memories 102 and 103, a main memory system 104, read-write buffer 105 and second cache or snoop cache 106.

FIG. 1 shows an embodiment of the present invention in which a computer system 100 comprises a CPU 101, instruction and data cache memories 102 and 103, a main memory system 104, read-write buffer 105 and secondary cache 106.

In computer system 100, secondary cache 106 is provided to form a two-level cache system. Alternatively, secondary cache 106 can also be used as a "snoop cache" in a shared memory multiprocessor system in which CPU 101 is one of the processors. In a shared memory multiprocessor system snoop cache 106 contains duplicate copies of the tags of memory words cached in the primary data cache 103. Tag matching circuitry is provided in system snoop cache 106 to monitor write accesses to main memory system 104. When a memory word is updated in main memory 104, if the updated memory word has an address which matches a tag stored in system snoop cache 106, i.e. the updated word is also cached in data cache 103, a cache hit signal MPInvalidate is generated on lead 171 at snoop cache 106. This cache hit signal is provided to CPU 101, which executes an intruction to invalidate the corresponding entries in data cache 103 and snoop cache 106. An external $\overline{\text{Reset}}$ signal on lead 170 resets CPU 101, read-write buffer 105, and secondary cache 106.

In this embodiment, main memory system 104 receives 32-bit addresses and 32-bit data on address bus 151 and 152 respectively. Three access types of memory operations are supported: read, write and read-modify-write operations. CPU 101 communicates with instruction and data caches 102 and 103 by providing the lower 16 bits of a memory address on bus 153, and, in accordance with the access type of the memory operation, the appropriate instruction cache read/write signal IWR (155) or a data cache read/write signal DWR (156).

When CPU 101 writes a datum in memory, CPU 101 asserts the $\overline{\text{MemWr}}$ signal 158. The higher 16 bits of a memory address is provided as a 16-bit tag on bus 154, and the lower 16 bits of the memory address is provided on the AddrLo bus 153. The datum to be written is provided on bidirectional Data bus 157. If the write operation is directed at a memory location in a "cacheable" space (i.e. a predefined portion of the memory space which is allowed to be copied into the cache), the signal DWR becomes active to allow update to data cache memory 103. For a noncacheable write access, data cache read/write signal DWR remains inactive. For CPU 101, the write operation is completed when the datum is written into read-write buffer 105. The actual write operation is completed when the memory controller of memory system 104 retrieves the datum from read-write buffer 105 for writing into main memory system 104.

In addition to the $\overline{\text{MemWr}}$ signal 158, CPU 101 provides to read-write buffer 105 the control signals AcTyp[0:2] on bus 160. The least significant two bits of this signal, i.e. signals AcTyp[0:1], indicate the size (1-4 bytes) of data accessed during a memory access operation. In a read operation, the signal AcTyp[2] indicate whether the memory location accessed is located in a cached or uncached space. During a write operation, the signal AcTyp[2] is undefined.

During a read operation, the lower 16 bits of the datum to be read is provided on AddrLo bus 153 to select an entry in either the instruction cache 102 or the data cache 103 The $\overline{\text{MemRd}}$ signal (159), which is provided to read-write buffer 105 and snoop cache 106, is asserted to initiate a read operation at main memory system 104. At the same time, CPU 101 compares a 16-bit tag stored at the addressed cache memory with the higher order 16 bits of the memory address. If the comparison yields a "cache hit", i.e. the datum to be read is found in the cache memory, the datum is latched from the Data bus 157. Otherwise, a "cache miss" has occurred. Accordingly, a cache refill operation is initiated to retrieve the missed data from main memory 104. In a cache refill operation, CPU 101 asserts the DWR signal but not the $\overline{\text{MemWr}}$ signal. The required data is read into the selected instruction or data cache 102 or 103 from main memory system 104 via read-write buffer 105, which is discussed in further detail below.

The present embodiment supports byte addressing and supports a write operation ("store partial") involving storing less than a word of data. In a store partial operation to a cacheable space, CPU 101 executes a read-modify-write access. The read-modify-write access involves (i) reading the 32-bit datum, which is aligned to a word boundary, at the specified byte address, (ii) writing the byte to be written into the 32-bit datum properly aligned at the byte address, and (iii) storing the modified 32-bit datum back. If there was a cache hit during the read portion of the read-modify-write access, CPU 101 proceeds with writing the modified datum into both data cache 103 and main memory system 104 by asserting both DWR signal 156 and $\overline{\text{MemWr}}$ signal 158. However, if a cache miss occurs, CPU 101 initiates a write operation to the main memory 104 via read-write buffer 105, but does not update data cache 103. In that situation, the $\overline{\text{MemWr}}$ signal 158 is asserted but not the DWR signal 156.

If instruction cache 102 is used as a swap cache, when performing a store to the "temporary data cache", CPU 101 asserts $\overline{\text{MemWr}}$ signal 158 and IWR signal 155.

Read-write buffer 105, which is interposed between CPU 101 and main memory system 104, manages memory access to main memory system 104. Read-write buffer 105 comprises eight write registers and eight read registers. The write registers allow CPU 101 and main memory 104 to operate asynchronously, and the read registers support efficient block refill for instruction and data caches 102 and 103. In addition to providing a memory address on bus 151 and appropriately reading and writing data on memory data bus 152, read-write buffer 105 provides control signals (described below) to main memory system 104. The interface between read-write buffer 105 and CPU 101 is shown schematically in FIG. 2. The interface between read-write buffer 105 and main memory system 104 is shown schematically in FIG. 4.

Figure 2:
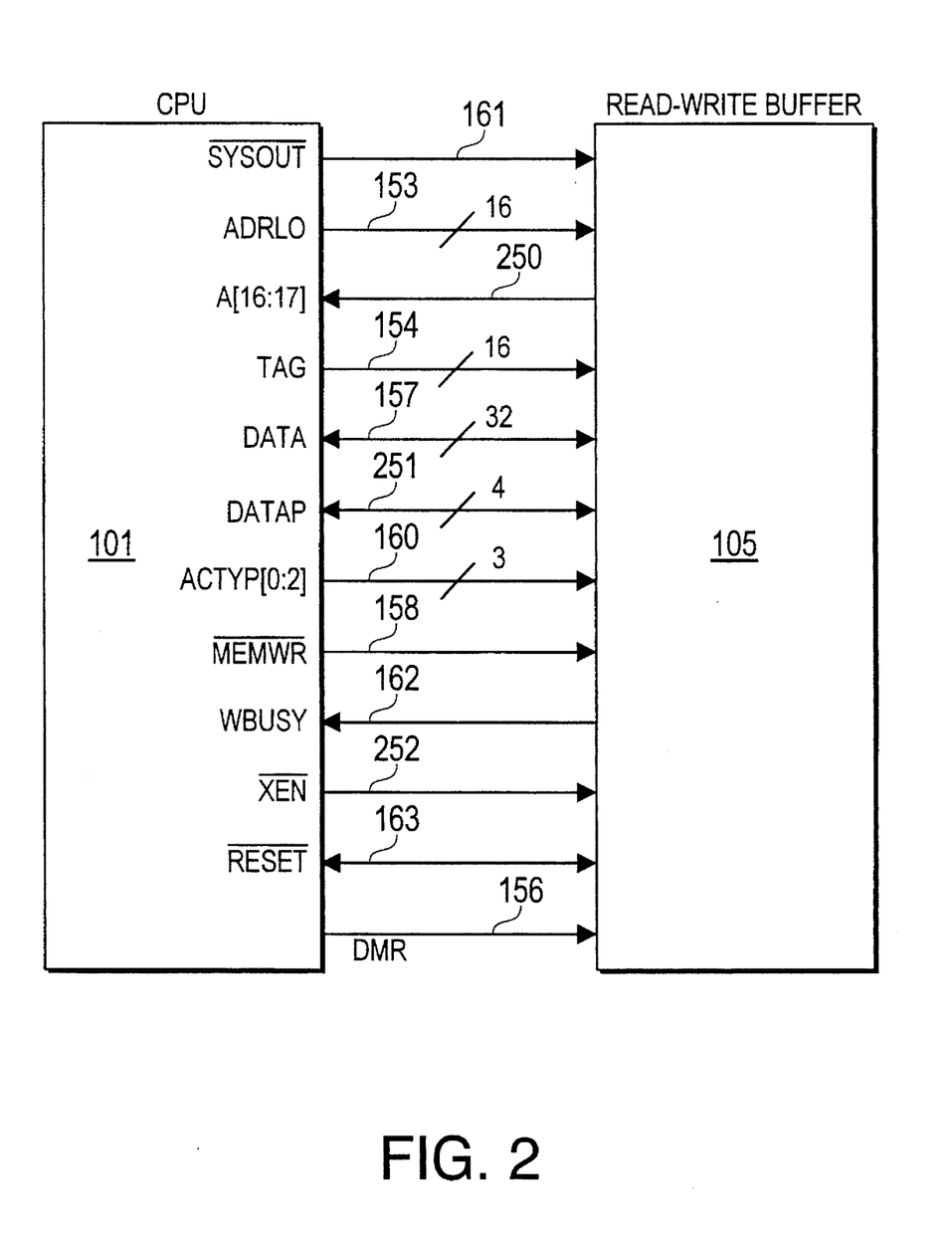
FIG. 2 shows schematically the interface between read-write buffer 105 and CPU 101.

As shown in FIG. 2, in addition to the 16-bit tag bus 154, AddrLo address bus 153, Data bus 157, AcTyp[2:0] signals 160, and the $\overline{\text{MemWr}}$ signal discussed above, read-write buffer 105 receives from CPU 101 a clock signal $\overline{\text{SysOut}}$ on lead 161 and an enable signal $\overline{\text{XEn}}$ (252). During a read operation, the $\overline{\text{XEn}}$ signal 252 enables read-write buffer 105 to place data from a read register in read-write buffer 105 onto Data bus 157. Since CPU 101 requires parity, a 4-bit parity bus DataP 251 provides the parity bits for the 32-bit data on Data bus 157. These parity bits are generated by read-write buffer 105, if main memory system 105 does not provide parity. A WBusy signal 162 is provided by read-write buffer 105 to indicate that the write registers in read-write buffer 105 are full. When WBusy is asserted, CPU 101 stalls on a memory write operation until WBusy is deasserted.

Figure 3:
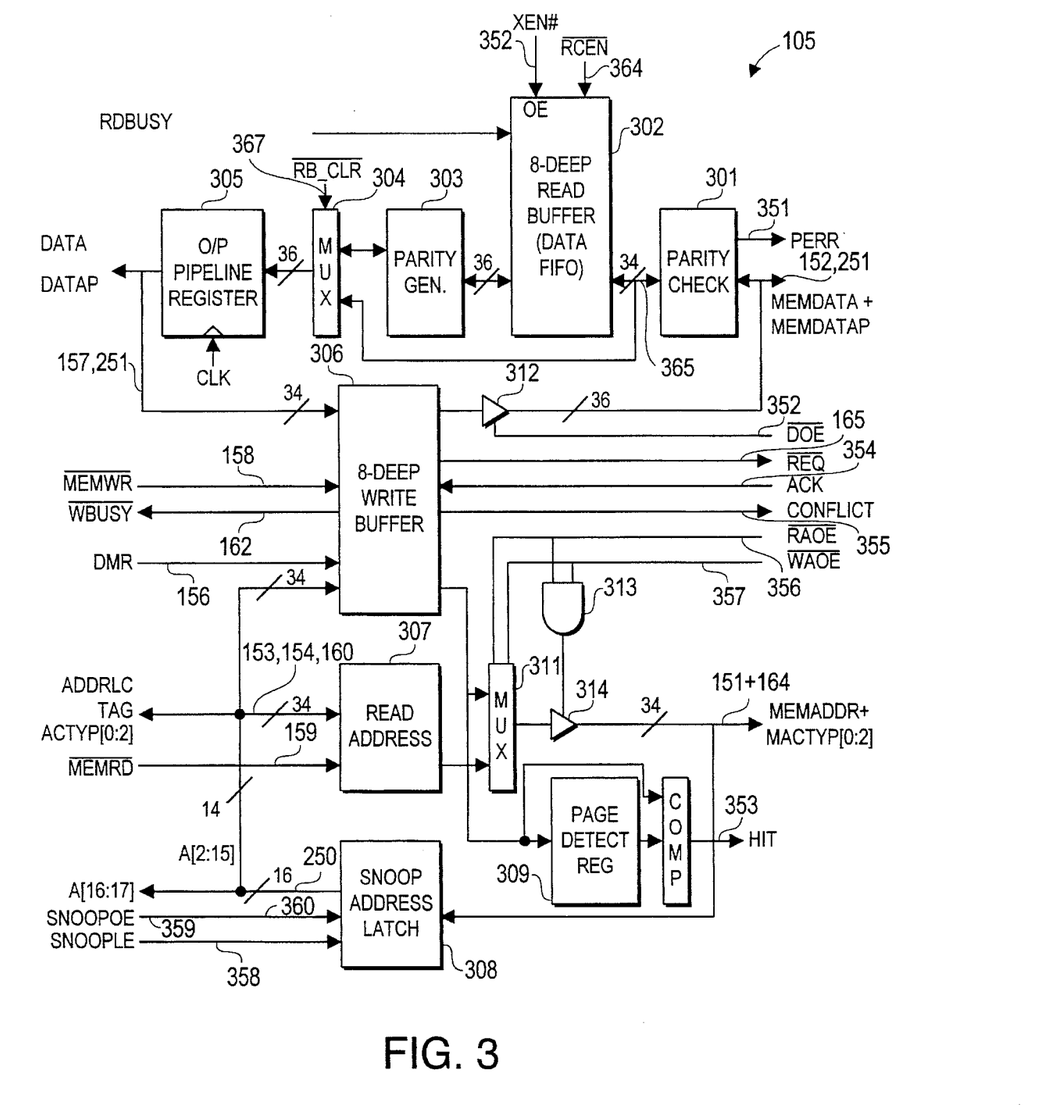
FIG. 3 is a schematic diagram of read-write buffer 105.

FIG. 3 is a schematic diagram of read-write buffer 105. As shown in FIG. 3, an 8-deep write buffer 306 and an 8-deep read buffer 302 are provided for the read and write operations. Write buffer 306 allows the processor to issue write operations without waiting for the actual write operation to complete in memory system 104. The data written into write buffer can be retired to main memory system 104 at a slower rate.

As shown in FIG. 3, a register of write buffer 306 captures both the datum to be written into main memory 104 and the necessary address information. The datum to be written in memory system 104 is captured from Data bus 157, along with the parity bits on 4-bit bus 251. In addition, the necessary address information is obtained from the bits of the AddrLo and tag bus 153 and 154, and the 3-bit AcTyp [0:2] bus 160. As discussed above, bits AcTyp[0:1] indicate the number of bytes to be written, and bit AcTyp[2] indicates whether the memory address resides in a cached or uncached space during a read operation.

If CPU 101 executes a store instruction while write buffer 306 is full, as indicated by read-write buffer 105's asserting WBusy signal 162, CPU 101 stores the datum into data cache 103 by asserting the DWR signal and waits on the WBusy signal to be deasserted. The WBusy signal is asserted whenever the eighth register of read buffer 306 is filled. Upon deassertion of the WBusy signal, CPU 101 writes the datum into write buffer 306 by asserting the $\overline{\text{MemWr}}$ signal on lead 158.

When write buffer 306 contains data to be written to main memory system 104, the $\overline{\text{req}}$ signal on lead 165 is asserted and remain asserted until all registers in write buffer 306 is empty. (The $\overline{\text{req}}$ signal is set to the inactive state during system reset to prevent undefined content of write buffer 306 to be inadvertently written into main memory system 104). To retrieve data from write buffer 306, main memory system 104 asserts data output enable signal $\overline{\text{DOE}}$ and write address output enable signal $\overline{\text{WAOE}}$ on leads 352 and 357 respectively. In response to these signals from main memory system 104, the content of the next register in write buffer 306 ("current write register"), which is pointed to by a write buffer counter (not shown), is provided on memory data bus 152 (32-bit data), memory parity bus 251 (4-bit parity), memory address bus 151 (address bits A[0:31]) and memory access type bus 164 (access type MAcTyp[0:2]). Two of the bits, MAcTyp[0:1], on memory access type bus 164 represents the data size of the memory access, corresponding the bits AcTyp[0:1] on access type bus 160 from CPU 101. Bit MAcTyp[2] of memory access type bus 164, which is generated by the circuit shown in FIG. 5, indicates whether the write access is in cacheable or uncacheable space. Multiplexor 311 selects bits in the address portion of the current write register. Upon capturing the data on bus 152, main memory system 104 asserts on lead 354 the acknowledge signal ACK, which also serves as a request signal for outputting the content of the next write register.

The present embodiment supports the use of page mode access during write operations in certain DRAM implementation of main memory 104. Page mode access is feasible when successive write operations are directed to the same page of the main memory system 104. The page address in the present embodiment is formed by the higher order 21 bits of the memory address. Page Detection is accomplished by comparator 310, which compares the page address of the current write access with the page address of the most recent write access stored in page address register 309. If comparator 310 determines that the page addresses are equal, the signal Hit is asserted on lead 353 to indicate page mode access is possible. An intervening read operation between write operations deasserts the Hit signal.

Byte gathering is supported in this embodiment. When a signal $\overline{\text{gather}}$ (not shown) is asserted, write buffer 306 performs byte gathering by comparing the memory word address of a new write operation with the word address stored in the most recently written register. If the two word addresses are equal, for example when each write operation is accessing data in the same word address under a different legal access type, the write buffer counter is prevented from being incremented. Thus, byte gathering minimizes the number of write transfers necessary by consolidating multiple write operations to the same location in main memory system 104. Byte gathering is inhibited for the current write register.

Read buffer 302 is an 8-deep buffer for receiving data from read operations in main memory 104. Each of the eight registers of read buffer 302 is 36-bit wide to hold a 32-bit datum and four parity bits. Read buffer 302 supports block refills into instruction and data caches 102 and 103 under control of CPU 101. In this embodiment, two methods are available to support CPU 101's block refill mechanism. In one method, main memory system 104 supplies the refill block of data at CPU 101's clock speed. This method can be achieved by organizing main memory 104 into interleaved banks of page-mode or static-column DRAMs. Under this method, read buffer 302 is bypassed and data is directly routed from memory data bus 152, after parity check by parity circuit 301, through multiplexor 304 and pipeline register 305 onto Data and parity buses 157 and 251.

Alternatively, a second method supports an implementation of main memory system 104 which does not have the bandwidth to provide the refill block of data at CPU 101's clock speed. Under this second method, the 32-bit data (including parity bits) from memory data bus 152 are captured and stored in registers of read buffer 302. CPU 101 can then clock each register individually to retrieve the captured data out of read buffer 302.

Read-write buffer 105 provides parity generation and checking. Parity generation allows an implementation of main memory system 104 without stored parity. If main memory system 104 supports parity, a parity error on the memory bus 152 can be detected by parity circuit 301 and reported as signal PErr on lead 351.

During a read operation, the read address is latched into read address latch 307 by signal $\overline{\text{MemRd}}$ on lead 159 and passes through multiplexer 311 to memory address bus 151 when the signal $\overline{\text{RAOE}}$ is asserted by main memory system 104 on lead 356. When the signal $\overline{\text{RCEN}}$ is asserted on lead 364, the data register ("current read register") specified by the content of the read buffer counter is loaded with the content of memory data bus 152. Signal $\overline{\text{RCEN}}$ then increments the read buffer counter. When $\overline{\text{RCEN}}$ goes low, the content of the read buffer counter points to a new current read register, i.e. the next register in the read buffer 302. This new register receives the next datum from memory data bus 152. This $\overline{\text{RCEN}}$ signal also controls the release of the read address latch 307.

When active, input signal $\overline{\text{RB\_Clr}}$ on lead 367 causes mutiplexor 304 to select the datum at the output bus 365 of parity check circuit 301, thereby bypassing read buffer 302. As long as signal $\overline{\text{RB\_Clr}}$ is active, neither the read and write buffer counters is incremented or decremented. Data is output to the Data bus 157 via pipeline register 305.

In the present embodiment, conflicts between the write and read operations can arise. Specifically, CPU 101 or, in a shared memory multiprocessor system, another processor may execute a read operation to a memory location where a write operation is incomplete. Such conflict arises when the current data for the memory location accessed by the read operation is pending in write buffer 306 and has not yet been retired to the main memory system 104. Thus, a circuit for detecting such conflict is provided in write buffer 306.

A conflict is detected when the read address is within a refill block size from an address in a register of write buffer 306. Since read-write buffer 105 supports block refills of the 4, 8, 16, and 32 words, the conflict logic compares the block addresses (each block address comprising a subset of the bits in a memory address) of the data in write buffer 306 with the block address of the datum to be read. The block address will vary depending on the refill block size used. In the present embodiment, a 2-bit input signal Blk[1:0] encodes the refill block size. The block size determines which bits of a memory address form the block address. A detected conflict is reported on lead 355.

When signal SnoopLE becomes active on lead 358, Snoop address latch 308 latches the address and access types from the memory address and access type buses 151 and 164 respectively. In a shared memory multiprocessor system, when another processor, other than CPU 101 requests an update to a memory location, the address of the memory location is latched by snoop address latch 308. This latched address can be used to invalidate a corresponding cached copy of the data in data cache 103. When signal $\overline{\text{SnoopOE}}$ on lead 369 goes active, the address in snoop address latch 308 is output respectively onto AddrLO, tag and AcTyp[0:2] buses 153, 154 and 160. This address, in addition to the MPInvalidate signal on lead 171 received from snoop cache 106, allows CPU 101 to invalidate the proper entries in data cache 103 and snoop cache 106.

Figure 4:
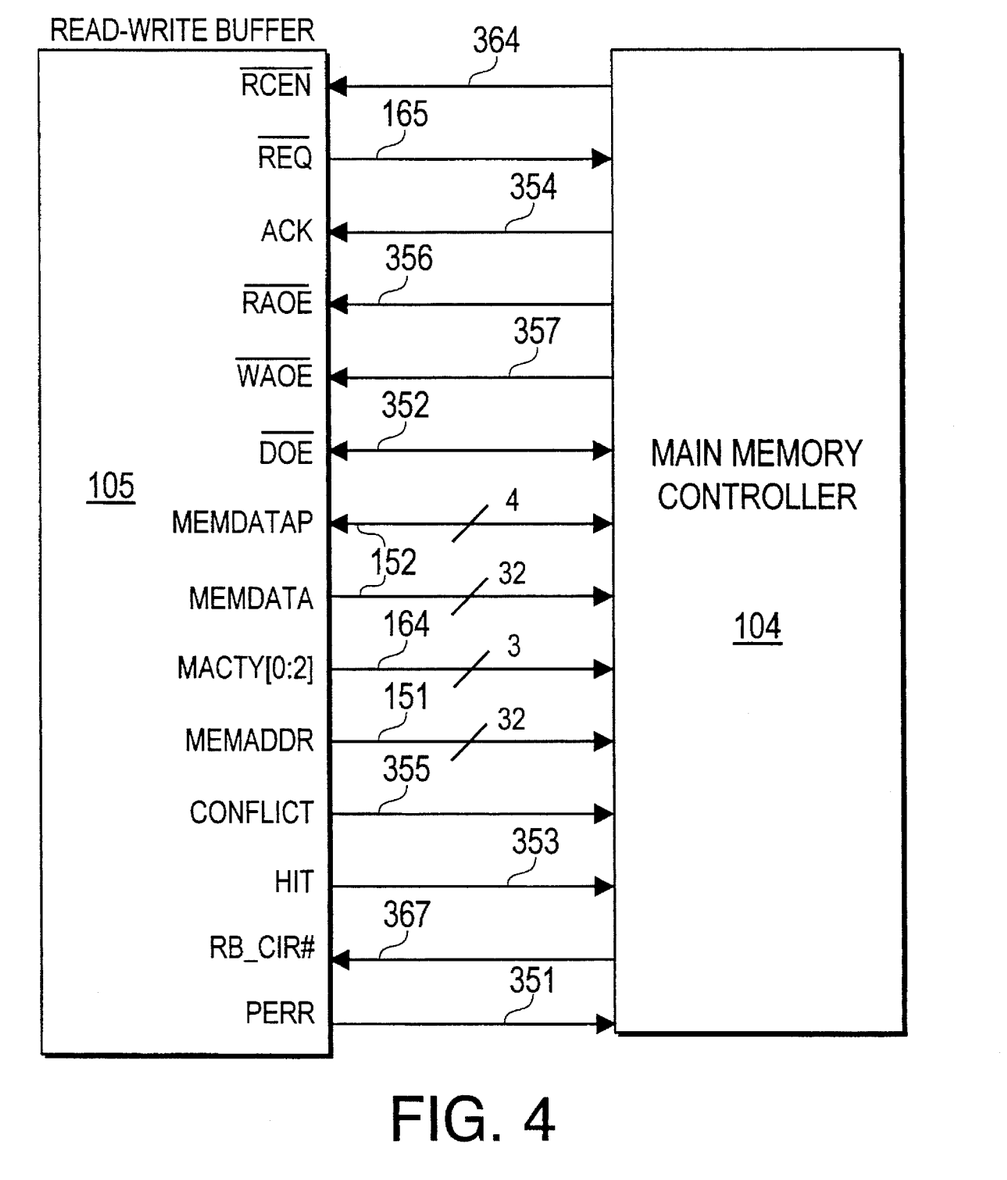
FIG. 4 shows schematically the interface between read-write buffer 105 and main memory system 104.

FIG. 4 shows schematically the interface between read-write buffer 105 and main memory system 104. The signals shown in this interface have been described in detail above.

Figure 5:
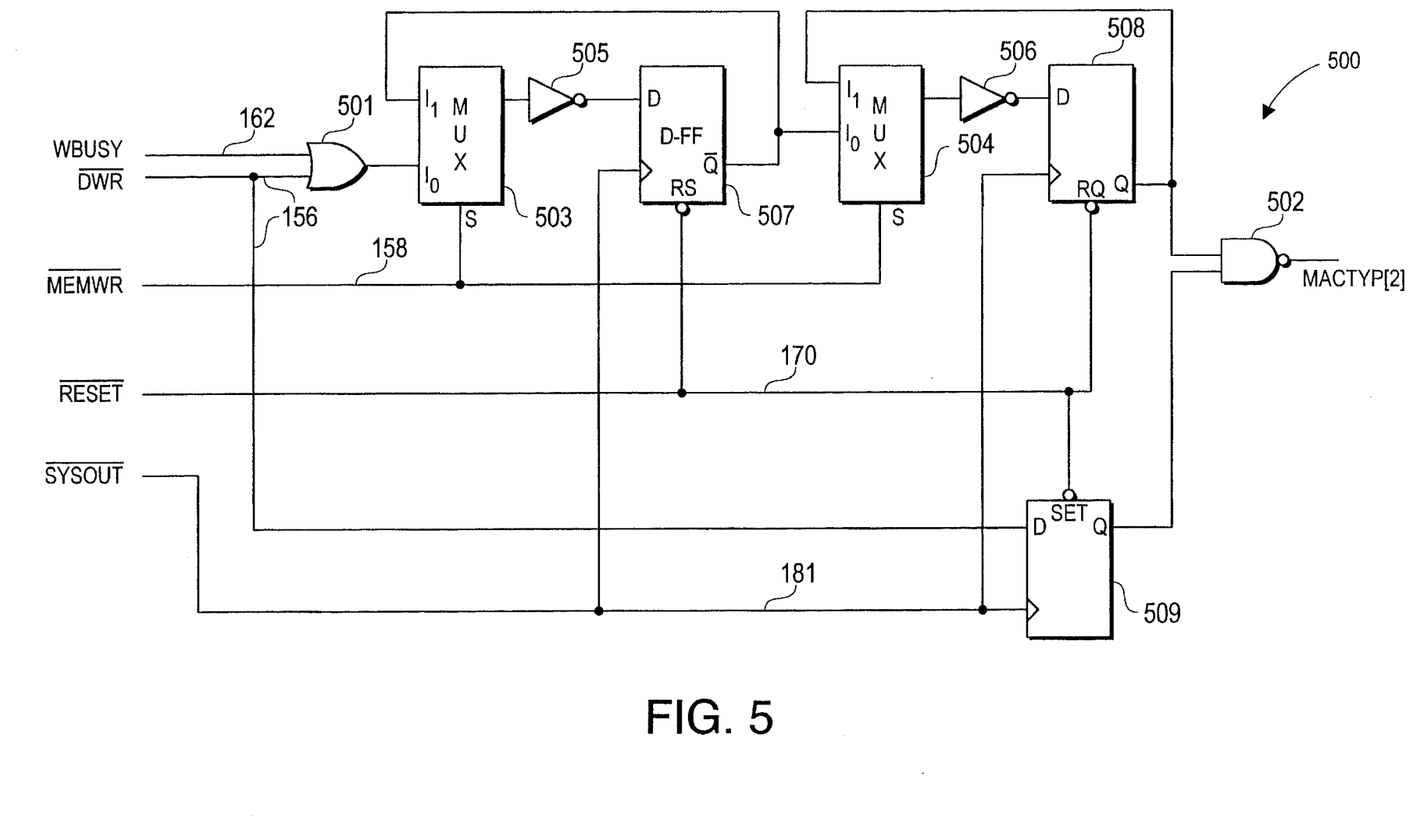
FIG. 5 shows a schematic circuit 500 which generates a signal MAcTyp[2] for indicating whether a memory write access to cacheable space is performed.

FIG. 5 shows a circuit which generates the MAcTyp[2] signal on memory access type bus 164 to indicate whether the memory access is to cacheable or uncacheable space. Read-write buffer 105 generates MAcTyp[2] because the corresponding memory access signal AcTyp[2] signal is undefined during a write access. Since system snoop cache 106 monitors the write address of a write access to memory system 104, the MAcTyp[2] signal inhibits the address matching in system snoop cache 106 during a write memory access to uncacheable space and thereby enhances efficiency.

As shown in FIG. 5, when the $\overline{\text{MemWr}}$ signal on lead 158 is inactive, i.e., no pending memory write operation is being carried out, the state of the $\overline{\text{DWR}}$ signal on lead 156 is being latched into latch 509 at every clock period of clock signal $\overline{\text{SysOut}}$ on lead 181. With signal $\overline{\text{MemWr}}$ inactive, signal $\overline{\text{DWR}}$ is only active during a memory read operation to cached space, i.e. when a cache refill is being performed. Thus, NAND gate 502, which outputs the MAcTyp[2] signal provides logic "1" during a memory read operation to cacheable space.

On the other hand, when signal $\overline{\text{MemWr}}$ is active, i.e. a memory write operation is performed, signal $\overline{\text{DWR}}$ on lead 156 is active only when the memory write operation accesses a cacheable memory location. Thus, NAND gate 502 outputs as the MAcTyp[2] signal a logic "1," when a write access to a cacheable space is performed, since both input signals to NAND gate 502 are at logic "0", after two periods of the $\overline{\text{DWR}}$ clock signal becoming active); otherwise, when a write memory access to uncacheable space is performed, NAND gate 502 outputs as the MAcTyp[2] signal a logic "0" signal, since both input signals to NAND gate 502 are at logic "1," after two periods of the $\overline{\text{SysOut}}$ clock signal. However, if the memory access is performed after the $\overline{\text{WBusy}}$ signal becomes active, i.e. after a memory access is delayed due to a write-buffer-full condition at read-write buffer 105, NAND gate 502 outputs as the MAcTyp[2] signal a logic "0," indicating access to a cacheable location, regardless of whether or not a cacheable location is actually accessed.

The detailed description provided above are intended to be illustrative of the specific embodiments of the present invention and not for limiting the present invention. Many variations and modifications within the scope of the present invention are possible. The present invention is set forth in the following claims.

We claim:

1. A computer system having a processor bus including data and address portions, and a memory bus coupled to a main memory, said main memory including a plurality of cacheable and non-cacheable memory locations, said computer system comprising:

a primary cache memory coupled to said processor bus, said primary cache memory receiving (i) a datum placed on said data portion of said processor bus and (ii) a cache write enable signal which is asserted when said datum on said processor bus is to be written into said primary cache memory;

a buffer memory, coupled to said processor bus and said memory bus, said buffer memory including a plurality of read registers and a plurality of write registers, said buffer memory receiving (i) said datum placed on said processor bus and (ii) a buffer write enable signal which is asserted when a datum is to be written into one of said write registers;

a central processing unit coupled to said processor bus, said central processing unit, during a store operation to a cacheable memory location, asserts said cache write enable signal and said buffer write enable signal, and during a store operation to a non-cacheable memory location asserts said buffer write enable signal and deasserts said cache write enable signal;

a circuit receiving said cache write enable signal and said buffer write enable signal for generating a control signal for indicating whether a store operation is performed on a cacheable memory location or a noncacheable memory location, in accordance with whether or not said cache write enable signal is enabled and whether or not said buffer write enable signal is enabled; and a secondary cache memory receiving said control signal, said secondary cache memory performs a store operation when control signal indicates that said store operation is directed to a cacheable memory location.

2. A computer system as in claim 1, wherein (i) said central processing unit supports a store partial instruction, and (ii) said primary cache memory provides a cache miss signal indicating a cache miss condition when asserted, said central processing unit asserting both said cache write enable signal and said buffer write enable signal, when said cache miss signal is inactive, and asserting said buffer write enable signal and deasserting said cache write enable signal, when said cache miss is asserted.

3. A computer system as in claim 1, wherein (i) said computer system is a multiprocessor system, and (ii) said secondary cache memory also acts as a snoop cache, said secondary cache memory maintaining a list of tags of said primary cache memory, said secondary cache memory comparing addresses on said memory bus and asserts a second control signal, which is received by said central processing unit, when a corresponding portion of said memory address matches one of said tags of said primary cache memory.

4. A computer system as in claim 1, wherein said buffer memory asserts a second control signal, which is received by said central processing unit, indicating that all of said write registers contain data, said central processing unit stalls execution of a store instruction until after said second control signal is deasserted.

5. A computer system as in claim 1, further including a parity circuit for generating parity bits for said data portion of said processor bus.

6. A computer system as in claim 1 wherein, when said central processing unit executes a cache refill operation, said cache write enable signal is asserted and said buffer write enable signal is deasserted.

* * * * *